Patented Oct. 12, 1948

2,451,386

BEST AVAILABLE COPY

UNITED STATES PATENT OFFICE 2,451,386

ISOMERIZATION OF 1,4-DICYANO-2-BUTENE

Glenn F. Hager, Wilmington, Del., assignor to E. I. du Pont de Nemours & Company, Wilmington, Del., a corporation of Delaware No Drawing. Application June 20, 1947, Serial No. 756,097

6 Claims. (Cl. 260—465.8)

This invention relates to unsaturated nitriles. More particularly, it relates to 1,4-dicyano-2-butene and its isomer, 1,4-dicyano-1-butene.

1,4-dicyano-2-butene, also referred to as beta-hydromucononitrile, is described in U. S. Patent 2,342,101 and it may be prepared from 1,4-dichloro-2-butene by the method set forth therein. 1,4-dicyano-2-butene is a highly important intermediate in chemical syntheses, for example, in the preparation of nylon intermediates such as hexamethylenediamine. However, in some uses such as the one just mentioned, it is more advantageous to use the isomeric dinitrile, 1,4-dicyano-1-butene, which is a liquid at ordinary temperature and therefore more convenient to handle in industrial practice than the solid 1,4-dicyano-2-butene. Moreover, 1,4-dicyano-1-butene can be reduced to hexamethylene diamine more readily and in better yields than 1,4-dicyano-2-butene.

Because the chemical structure of 1,4-dicyano-1-butene, as shown by its formula $$CN—CH_2—CH_2—CH{=}CH—CN$$

comprises a carbon-nitrogen triple bond conjugated with a carbon-carbon double bond, it is capable of many reactions which are not possible with the isomeric 1,4-dicyano-2-butene. Heretofore no convenient and economical method of preparing 1,4-dicyano-1-butene has been described.

An object of this invention is to provide a method of preparing 1,4-dicyano-1-butene. Another object is to provide a method of preparing 1,4-dicyano-1-butene from its isomer 1,4-dicyano-2-butene, itself readily available from the chlorination products of 1,3-butadiene. Other objects will appear hereinafter.

These objects are accomplished by a method of isomerizing 1,4-dicyano-2-butene to 1,4-dicyano-1-butene which comprises maintaining a solution of 1,4-dicyano-2-butene in a reaction medium having a dielectric constant at 18° C. above 10 in contact at elevated temperature with a hydrogenating metal until an appreciable amount of 1,4-dicyano-1-butene has formed.

In a prefrred embodiment of the invention, a solution of 1,4-dicyano-2-butene in a neutral to basic solvent having a dielectric constant at 18° C. above 10 is heated in contact with 0.5 to 5%, based on the weight of the dicyanobutene, of a metal of atomic number between 24 and 30, inclusive, at a temperature between 50° C. and the boiling point of the solvent, until substantially complete isomerization to 1,4-dicyano-1-butene has taken place. Still more preferably, the reaction medium is a neutral hydroxylated solvent, e. g. water or a low molecular weight alcohol of up to four carbon atoms.

The term "hydrogenating metals," in accordance with established usage (see, for example, U. S. Patents 1,746,783; 2,358,234; 2,358,235) refers to those metals below calcium in the electromotive series which act as catalysts in catalytic hydrogenation processes, examples of which are manganese, zinc, chromium, iron, cadmium, cobalt, nickel, tin, lead, copper, and silver.

The dielectric constant of numerous solvents, which is a measure of their polarity, may be found in standard reference books such as the International Critical Tables, vol. VI, p. 82. See also Taylor, A Treatise on Physical Chemistry, second ed., vol. I, p. 718.

The invention is further illustrated by the following examples, in which parts are by weight, unless otherwise specified.

*Example I*

A solution of 50 parts of 1,4-dicyano-2-butene (M. P. 76–77.5° C.) in 315 parts of absolute ethanol is stirred at reflux temperature (79° C.) with 1 part of copper powder for 14 hours. The catalyst is filtered off and the solvent is removed by distillation in a continuous stripping still. The residual oil, which is liquid at room temperature, gives on distillation 39.1 parts (78% yield) of a liquid boiling between 99° C. at 1.0 mm. and 113.5° C. at 1.1 mm. and whose refractive index, $n_D^{25}$, ranges between 1.4637 and 1.4652. This material has the composition required by the formula $C_6H_6N_2$. It is a mixture of the trans and cis isomers of 1,4-dicyano-1-butene. The geometric isomers can be separated by distillation through an efficient fractionating column. They have the following properties:

Trans isomer: B. P. 84.5–86.5° C. at 0.35–0.44 mm. pressure. M. P. −13 to −12° C.; $n_D^{25}$: 1.4646
Anal.: Calc'd for $C_6H_6N_2$: C, 67.91; H, 5.67
Found: C, 68.09, 68.18; H, 5.37, 5.82

Cis isomer: B. P. 99.5–102.5° C. at 0.38 mm. pressure. M. P. −25 to −23° C.; $n_D^{25}$: 1.4677
Anal.: Calc'd for $C_6H_6N_2$: C, 67.91; H, 5.67
Found: C, 67.98, 67.85; H, 5.63, 5.82

1,4-dicyano-1-butene is further identified by oxidative hydrolysis with nitric acid which gives succinic acid. Likewise, ozonization and hydrolysis gives succinic acid. Hydrogenation over a cobalt catalyst in methanol at 130° C. and 580–940 atmospheres hydrogen pressure gives hexamethylene diamine in 73.5% yield.

*Example II*

A mixture of 10 parts of 1,4-dicyano-2-butene, 100 parts of distilled water, and 0.5 part of copper powder is stirred at 100° C. At that temperature, 1,4-dicyano-2-butene is soluble in water at that concentration. After 20 hours at 100° C. the reaction mixture is cooled and the oily layer is separated and distilled, giving 7.6 parts of a liquid dinitrile containing 68.05% carbon, 5.87% hydrogen and 27.11% nitrogen. This is a mixture of the cis and trans isomers of 1,4-dicyano-1-butene, which may be separated by fractional distillation if desired.

*Example III*

A solution of 10 parts of 1,4-dicyano-2-butene in 100 parts of acetonitrile is stirred with 0.5 part of copper powder at the boiling point of acetonitrile (82° C.) for 20 hours. Isolation of the product as in Example I gives 8.4 parts of liquid 1,4-dicyano-1-butene, B. P. 101.5–112° C. at 1.1 mm. pressure, $n_D^{25}=1.4652-1.4673$.

*Example IV*

A solution of 10 parts of 1,4-dicyano-2-butene in 80 parts of absolute methanol is stirred at reflux temperature (65° C.) in contact with 1 part of alloy-skeleton cobalt for 20 hours (this catalyst may be prepared as described in U. S. Patent 2,257,800 to B. W. Howk). Isolation of the product as in Example I gives 9.53 parts of 1,4-dicyano-1-butene.

*Example V*

A solution of 100 parts of 1,4-dicyano-2-butene in 400 parts of 95% ethanol is stirred at reflux temperature (80° C.) in contact with 5 parts of the alloy-skeleton cobalt catalyst of the preceding example for 20 hours. Isolation of the product as in Example I gives a 94.5% yield of a mixture of the geometric isomers of 1,4-dicyano-1-butene, boiling between 82° C. at 0.14 mm. and 87° C. at 0.25 mm. pressure.

*Example VI*

A solution of 20 parts of 1,4-dicyano-2-butene in 60 parts of pyridine is heated with stirring at 105–110° C. in contact with 1 part of zinc dust for 20 hours. Isolation of the product as in Example I gives 15.4 parts of 1,4-dicyano-1-butene, which on fractional distillation is found to contain 69% of the trans isomer and 31% of the cis isomer.

*Example VII*

A solution of 20 parts of 1,4-dicyano-2-butene in 60 parts of nitrobenzene is heated with stirring at 120–140° C. in contact with 1 part of copper powder for 20 hours. There is obtained after removal of the nitrobenzene by distillation 15.2 parts of 1,4-dicyano-1-butene (mixture of isomers) boiling at 83–97° C. at 0.3 mm. pressure.

*Example VIII*

Fifty (50) parts of 1,4-dicyano-2-butene without any added solvent is stirred with 1 part of copper powder for 8 hours at 140° C. At the end of this time, the reaction product, which is liquid at room temperature, is filtered and distilled. There is obtained 20 parts (40% yield) of trans 1,4-dicyano-1-butene, B. P. 73–90° C. at 0.3 mm. pressure, $n_D^{25}=1.4651$, and 18 parts (36% yield) of the cis isomer, B.P. 90–96° C., at 0.14 mm. pressure, $n_D^{25}=1.4677$. In this case the 1,4-dicyano-2-butene and 1,4-dicyano-1-butene which, like other nitriles of comparable structure, have a high dielectric constant, act as the reaction medium for the isomerization.

In the method of this invention there may be used any solvent for the 1,4-dicyano-2-butene having a dielectric constant at 18° C. above 10. Solvents of low dielectric constant such as benzene, chloroform or acetic acid are ineffective. In addition to the solvents mentioned in the examples, other suitable materials include butyronitrile, dicyanoethane, isobutanol, acetamide, ethylene glycol, acetone, cyclohexanone, benzaldehyde, m-chloroaniline, etc. Obviously, the solvent should be substantially inert chemically toward 1,4-dicyano-2-butene and 1,4-dicyano-1-butene at the reaction temperature. In particular, it should have no appreciable hydrolyzing action on the nitriles even at elevated temperature.

As has been shown, 1,4-dicyano-2-butene can be isomerized without extraneous solvent, that is, it and the 1,4-dicyano-1-butene, which have a high dielectric constant, act as a reaction medium for the isomerization reaction. In many cases this is a convenient method for isomerizing 1,4-dicyano-2-butene. Thus the reaction medium may be the reactant and liquid product themselves or an added solvent having the specified dielectric constant. When no extraneous solvent is used, however, it is necessary to maintain very efficient contact between the catalyst and the dinitrile and to use a relatively high temperature, such as 140° C. When such conditions are undesirable it is advantageous to use an extraneous solvent.

The solvent need not be one with which the dicyano-butene is miscible. Media having a limited solvent power such as water or mixtures of water with other solvents such as ethanol or acetonitrile may be used. It is only necessary that the dicyanobutene be soluble to an appreciable extent, e. g. about 5% at the operating temperature. The preferred solvents are those having a neutral to basic reaction. The proportions of solvent relative to the dicyanobutene are not critical, but to insure good contact with the metal catalyst it is preferable to have at least equal volumes of solvent and dicyanobutene. It is unnecessary and uneconomical to use more than about 10–20 volumes of solvent per volume of dicyanobutene.

Any hydrogenating metal may be used as catalyst, the most effective ones being those of atomic number between 24 and 30, i. e., chromium, manganese, iron, cobalt, nickel, copper, and zinc. For best results there should be used between 0.05 and 10% of catalyst based on the weight of 1,4-dicyano-2-butene, a preferred range being between 0.5 and 5%. It has been observed that salts of hydrogenating metals, e. g., cuprous halides are not effective isomerization catalysts under the conditions of this method.

The rate of isomerization is very slow at low or ordinary temperature. In order to achieve a practical reaction rate it is desirable to operate at a temperature above 50° C. The temperature may be as high as desired, although above about 175° C. there is danger of decomposition of the 1,4-dicyano-2-butene or its isomer. A preferred temperature range is between 60 and 150° C. If desired the reaction can be carried out in a closed vessel above the boiling point of the solvent, but preferably it is conducted at atmospheric pressure at temperatures not exceeding the refluxing point of the solution. To insure good contact with the metal catalyst it is desirable to stir the reaction mixture. If desired, the 1,4-dicyano-2-butene may be fed continuously over a fixed bed of isomerization catalyst such as copper, nickel and cobalt.

The isomerization may be stopped at any desired stage. The formation of an appreciable amount of 1,4-dicyano-1-butene can be readily ascertained by evaporating a sample of the reacting solution (if a solvent is used) and cooling the residue to room temperature. If the residue is semi-solid or liquid, it contains appreciable quantities of the liquid isomer. In general, it is advantageous to carry out the reaction to substantial completion. The reaction time depends on the solvent and temperature. In general, at temperatures above 50° C., the isomerization is substantially completed in from 6 to 20 hours.

The isomerization product may be isolated by any suitable method, the most convenient being to remove the catalyst by filtration, then to separate the 1,4-dicyano-1-butene from the solvent, if any, by distillation. If desired, the geometric isomers of 1,4-dicyano-1-butene may be separated but this operation is in general unnecessary.

As many apparently widely different embodiments of this invention may be made without departing from the spirit and scope thereof, it is to be understood that this invention is not limited to the specific embodiments thereof except as defined in the appended claims.

I claim:

1. A method for isomerizing 1,4-dicyano-2-butene to 1,4-dicyano-1-butene which comprises maintaining a solution of 1,4-dicyano-2-butene in a non-hydrolyzing reaction medium having a dielectric constant at 18° C. above 10 in liquid phase contact with a hydrogenating metal at an elevated temperature between 50° and 175° C. until 1,4-dicyano-1-butene is formed.

2. A method for isomerizing 1,4-dicyano-2-butene to 1,4-dicyano-1-butene which comprises maintaining a solution of 1,4-dicyano-2-butene in a non-hydrolyzing solvent having a dielectric constant at 18° C. above 10 in liquid phase contact with a hydrogenating metal of atomic number between 24 and 30 inclusive at an elevated temperature between 50° and 175° C. until 1,4-dicyano-1-butene is formed.

3. A method for isomerizing 1,4-dicyano-2-butene to 1,4-dicyano-1-butene which comprises maintaining a solution of 1,4-dicyano-2-butene in a non-hydrolyzing neutral to basic organic solvent having a dielectric constant at 18° C. above 10 in liquid phase contact with a hydrogenating metal of atomic number between 24 and 30 inclusive at an elevated temperature between 50° and 175° C. until 1,4-dicyano-1-butene is formed.

4. A method for isomerizing 1,4-dicyano-2-butene to 1,4-dicyano-1-butene which comprises maintaining a solution of 1,4-dicyano-2-butene in a non-hydrolyzing neutral hydroxylated solvent having a dielectric constant at 18° C. above 10 in liquid phase contact with a hydrogenating metal of atomic number between 24 and 30 inclusive at an elevated temperature between 50° and 150° C. until 1,4-dicyano-1-butene is formed.

5. A method for isomerizing 1,4-dicyano-2-butene to 1,4-dicyano-1-butene which comprises maintaining 1,4-dicyano-2-butene in a neutral aqueous solution in liquid phase contact with a hydrogenating metal of atomic number between 24 and 30 inclusive at an elevated temperature between 60° and 150° C. until 1,4-dicyano-1-butene is formed.

6. A method for isomerizing 1,4-dicyano-2-butene to 1,4-dicyano-1-butene which comprises maintaining 1,4-dicyano-2-butene in a neutral aqueous solution in liquid phase contact with a metallic copper catalyst at an elevated temperature between 60° and 150° C. until 1,4-dicyano-1-butene is formed.

GLENN F. HAGER.

REFERENCES CITED

The following references are of record in the file of this patent:

UNITED STATES PATENTS

| Number | Name | Date |
|---|---|---|
| 2,342,101 | Cass et al. | Feb. 22, 1944 |
| 2,381,691 | Schulze et al. | Aug. 7, 1945 |
| 2,384,630 | Mahan | Sept. 11, 1945 |

OTHER REFERENCES

Rupe: Liebig's Ann., vol. 256, pages 9–15 (1890).

Farmer: J. Chem. Soc. (London), vol. 123, pages 3326, 3331 (1923).

Kandiah et al.: J. Chem. Soc., vol. 1929, pages 2139, 2153.

Letch et al.: J. Chem. Soc., vol. 1932, pages 443–456.

Waterman et al.: Rec. trav. Chim., vol. 57, pages 629–636 (1938).

Rapoport et al.: Chem. Abstracts, vol. 33, col. 4116 (1939).